Patented May 22, 1934

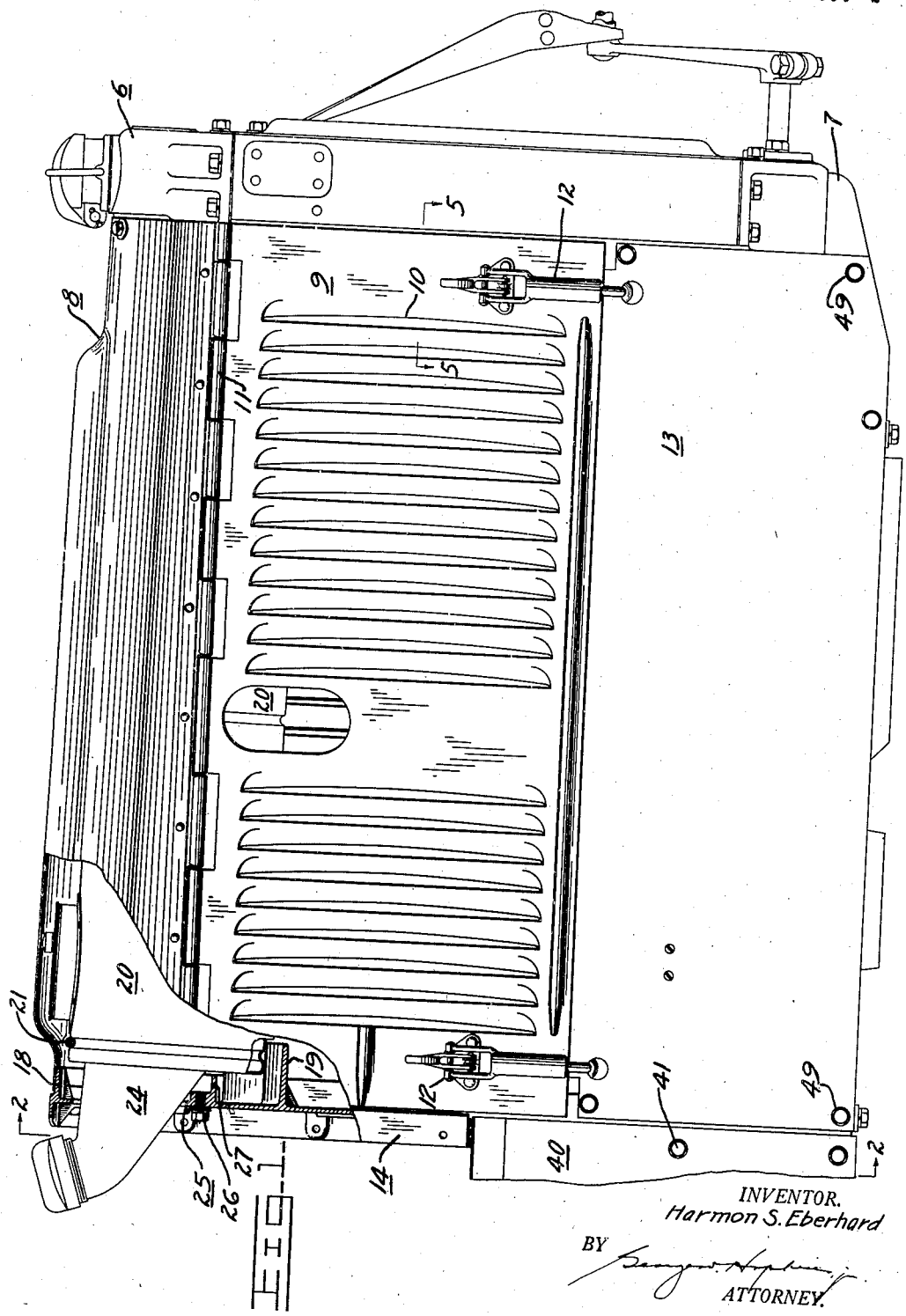

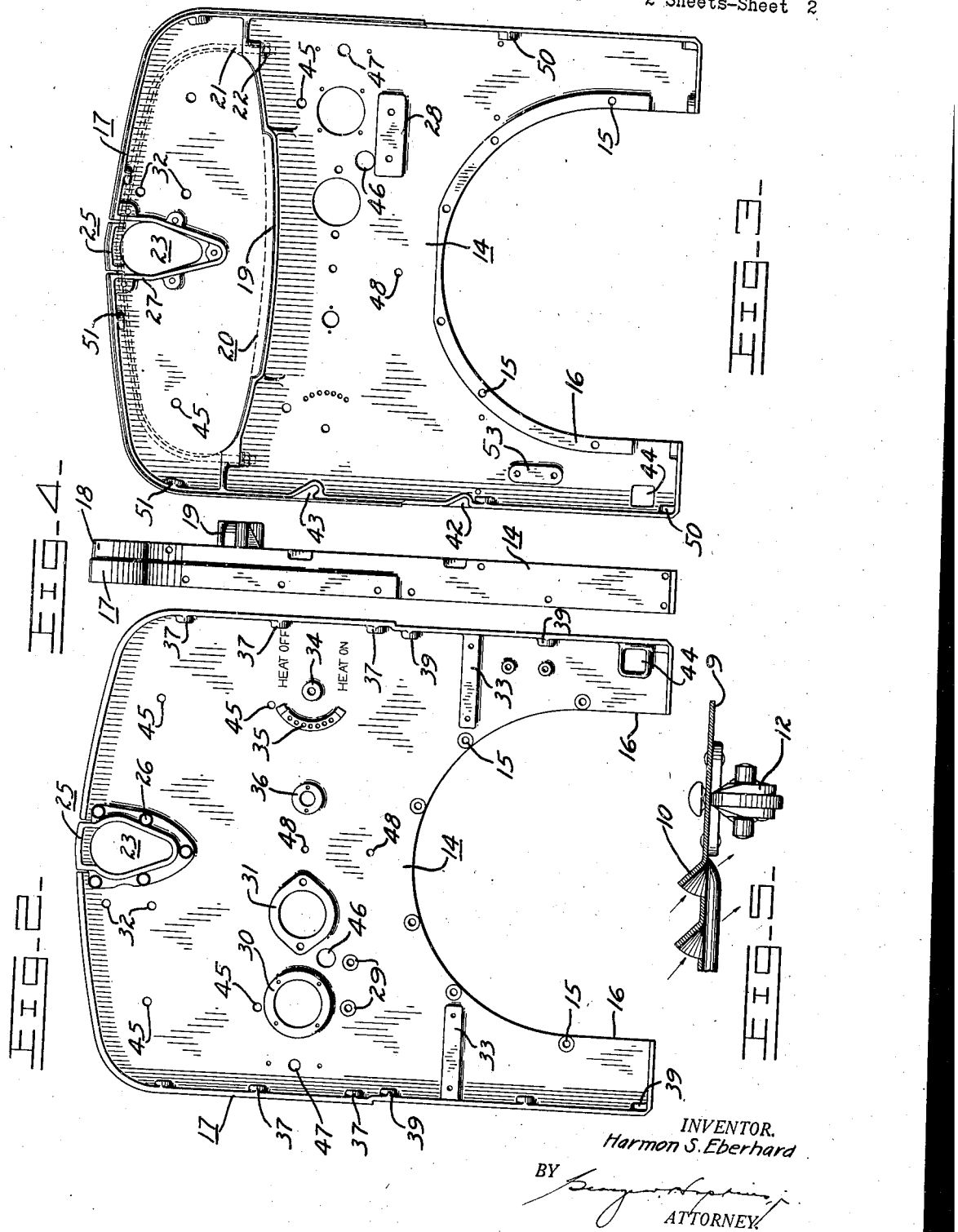

1,959,618

UNITED STATES PATENT OFFICE 1,959,618

MOTOR VEHICLE

Harmon S. Eberhard, San Leandro, Calif., assignor to Caterpillar Tractor Co., San Leandro, Calif., a corporation of California Application November 23, 1931, Serial No. 576,791

6 Claims. (Cl. 280—5)

Statement of invention

This invention relates to a motor vehicle construction.

An object of the invention is to provide a structure for advantageously mounting a tank so that the tank can be readily placed or removed.

Another object of the invention is to provide an improved dash structure for mounting a tank.

Description of drawings

In the drawings, Fig. 1 is a side elevation, partly in section, of the dash, radiator, and hood assembly of a motor vehicle.

Fig. 2 is a front view of a dash and instrument board.

Fig. 3 is a rear view of the board shown in Fig. 2.

Fig. 4 is a side elevation of the dash and instrument board.

Fig. 5 is a section along line 5—5 of Fig. 1.

Description of mechanism

In manufacturing a motor vehicle, I position radiator 6 (Fig. 1) upon end of frame 7. Radiator 6 serves to cool the medium used for heat removal from the engine of the vehicle, and as a support for one end of crown sheet 8 bolted to radiator 6. From crown sheet 8, doors 9 having louvers 10 are hung upon hinges 11. Doors 9 are held in place by latches 12 which are affixed to plates 13 secured to radiator 6 and frame 7 by studs 49. The engine is positioned within the space confined by crown sheet 8, doors 9, and plates 13, an air stream being drawn in through radiator 6 by a fan over the engine (not shown).

Member 14 (Figs. 2, 3, and 4) is provided opposite to radiator 6 for carrying crown sheet 8, positioning doors 9, and providing a support to which plates 13 can be secured by studs 49. Member 14 is constructed in one piece as by casting it of metal. To facilitate attachment of member 14, it is formed with depending portions 16 adapted to be attached by studs extended through apertures 15 to an engine or transmission housing.

Member 14 has a flange 17 extending about the periphery thereof which includes flange portion 18 furnishing a support upon which crown sheet 8 is bolted. With doors 9 in place, member 14 forms an enclosure for the engine, acting as a baffle to force the hot air stream and gases from the engine through louvers 10 in doors 9 and away from an operator who faces member 14. It is to be noted that louvers 10 (Figs. 1 and 5) in doors 9 extend inwardly toward the engine. Air is drawn in through radiator 6, passed over the engine, and is deflected by member 14 back in the direction of radiator 6, so that heated air finally exits through louvers 10 in a direction toward radiator 6 instead of toward the machine operator. This increases the comfort of the operator.

Member 14 (Fig. 1) also includes bracket 19 (Fig. 3) formed integrally therewith to engage the bottom of fuel tank 20 and to support fuel tank 20 which is positioned under crown sheet 8 between member 14 and radiator 6. Fuel tank 20 is held on bracket 19 by strap 21 and nuts 22 which engage bracket 19 to retain tank 20 in place. Member 14 has an aperture or notch 23 through which filling spout 24 from tank 20 is extended. Fuel can thus be placed in the tank without having to disturb the doors 9. By providing filling spout 24 so as to extend through member 14, the spilling of fuel, such as gasoline, onto a hot engine is obviated. Shroud member 25 (Figs. 1 and 2) is secured by studs 26 on member 14 to fit around notch 23 to enclose and seal spout 24. Shroud member 25 is removable and enables fuel tank 20 to be removed without having to disturb member 14 or radiator 6, upon removal of studs 26 and release of crown sheet 8. Removal of tank 20 is desirable when the cylinder head of the engine is to be removed. Since tank 20 can be readily removed, repair of the engine is facilitated.

Member 14 includes (Figs. 1 and 3) flange 27 which strengthens member 14 adjacent notch 23 and which also helps to position (Fig. 1) an end of tank 20. Shroud 25 is flanged and is well secured to member 14 to strengthen member 14 about notch 23.

Member 14, provided as an integral structure, possesses the further advantage that it can be employed as a dash, instrument board, and as a support upon which various other units, usual to the operation of the engine, can be affixed. Thus, bracket 28 (Fig. 3) formed integrally with member 14, provides a support upon which such a unit as an air cleaner can be attached, bosses 29 (Fig. 2) receiving studs to attach the cleaner. Likewise, boss 30 (Fig. 2) formed integrally with member 14 upon the operator's side of member 14, provides for attachment of an instrument such as an oil gauge, member 14 thereby serving as an instrument board. Another boss 31 (Fig. 2) provided integrally with member 14, serves as an attachment for a pipe which is extended above the vehicle as an air intake for the aforementioned air cleaner which is secured to bracket 28 and bosses 29. The air cleaner intake pipe is secured by a clamp fastened by bolts passed through holes 32. Raised faces 33 (Fig. 2) formed upon the operator's side of member 14 facilitates attachment of floor boards (not shown) to form an operator's compartment. A boss 34 (Fig. 2) and a cooperatively positioned segment 35 respectively provide a support for a shaft which extends to a heater for the intake manifold of the engine and means by which this shaft can be locked in a desired adjustment. Another boss 36 provides for mounting of an ignition lock switch. Threaded bosses 37 are included in flange 17 so that an auxiliary hood or cab can be attached, while bosses 39 provide for attachment of side plates 40 by studs 41. Bosses 50 are included on flange 17 to receive studs 49 which secure plates 13 while flange portion 18 has (Fig. 3) bosses 51 thereon to receive studs to secure crown sheet 8. Notches 42 and 43 (Fig. 3) permit one of louvered doors 9 to be raised and held in raised position by engaging a rod (not shown) carried by a door 9, with notch 43. Notch 42 receives the rod when door 9 is lowered and locked in place.

An auxiliary fuel tank can be secured by straps to member 14, bolts being passed through holes 45 and a fuel pipe line passed through hole 46 to the engine carburetor. Such other accessories as a light switch and an odometer can be fastened to member 14, holes 47 and 48 being respectively provided for this purpose.

For mounting a bracket for a governor control, faced portion 53 is positioned above aperture 44 which passes a control member extending adjacent the operator.

From the foregoing, I believe it will be apparent that I have devised a desirable construction which provides a single member performing simultaneously the functions of closing that casing or hood which encloses the motor and deflecting away from an operator hot air and gases ejected from the motor. The construction also provides an instrument panel, a dash, an advantageous support for the gas tank, and a support for the casing or hood extending about the motor. The mounting of fuel tank 20 is also such that the ready repair of the engine is possible without having to remove or disturb member 14 or radiator 6.

I, therefore, claim as my invention:

1. In a motor vehicle, a tank having a filling spout, a dash notched to receive said spout, and shroud means about said spout secured to said dash.

2. In a motor vehicle, a fuel tank having a spout, a member having a flanged notch to receive said spout, and a shroud adapted to be passed over said spout and fastened to said member to enclose a portion of said spout.

3. In a machine of the class described, a rigid dash having side edges reenforced by flanges, the flanges being formed with apertured bosses providing means for attachment of side members to said dash.

4. In combination, a tank having a spout, a member having a notch in the edge thereof to receive said spout, a second member adapted to close said notch to secure said spout, and means for securing the second member to the first-mentioned member.

5. In a motor vehicle, a rigidly secured dash having side edges and a top edge, the side edges being provided with integral flanges extending forwardly and rearwardly of said dash at substantially right angles to the plane of said dash, the top edge being provided with an integral flange extending forwardly of said dash at substantially right angles to the plane of said dash, the side flanges providing means for attachment of side plates thereto, said side plates serving to cover portions of the vehicle, said top flange serving to provide means for attachment of an engine cover thereto, and notches formed in a side flange to provide means for supporting a side door for the engine.

6. In a motor vehicle, a rigidly secured dash having side edges and a top edge, the side edges being provided with integral flanges extending forwardly and rearwardly of said dash at substantially right angles to the plane of said dash, the top edge being provided with an integral flange extending forwardly of said dash at substantially right angles to the plane of said dash, the side flanges providing means for attachment of side plates thereto, said side plates serving to cover portions of the vehicle, said top flange serving to provide means for attachment of an engine cover thereto, integral bosses on a face of said dash for supporting auxiliary apparatus, a raised face formed on the operator's side of said dash to provide a support for a floor board, and notches formed in a side flange to provide means for supporting a side door for the engine.

HARMON S. EBERHARD.